United States Patent
Kabai (10) Patent No.: US 11,999,374 B2
(45) Date of Patent: Jun. 4, 2024

(54) SPATIAL AWARE OBJECT DETECTION BY LIDAR AND CAMERA FUSION BASED SUPER-RESOLUTION

(71) Applicant: Continental Automotive GmbH, Hannover (DE)

(72) Inventor: Robert-Zsolt Kabai, Vecses (HU)

(73) Assignee: Continental Automotive GmbH, Hannover (DE)

( * ) Notice: Subject to any disclaimer, the term of this patent is extended or adjusted under 35 U.S.C. 154(b) by 509 days.

(21) Appl. No.: 17/090,808

(22) Filed: Nov. 5, 2020

(65) Prior Publication Data

US 2021/0146951 A1  May 20, 2021

(30) Foreign Application Priority Data

Nov. 14, 2019 (EP) ..................................... 19209044

(51) Int. Cl.
*B60W 60/00* (2020.01)
*B60W 30/00* (2006.01)
(Continued)

(52) U.S. Cl.
CPC .......... *B60W 60/001* (2020.02); *B60W 30/00* (2013.01); *B60W 30/0956* (2013.01); *G01S 17/04* (2020.01); *G01S 17/89* (2013.01); *G01S 17/931* (2020.01); *G06N 20/00* (2019.01); *G06T 7/521* (2017.01); *G06T 7/55* (2017.01); *B60W 2420/403* (2013.01); *B60W 2420/408* (2024.01);
(Continued)

(58) Field of Classification Search
CPC ............... B60W 60/001; B60W 30/00; B60W 30/0956; B60W 2420/52; G01S 17/04; G01S 17/89; G01S 17/931; G06N 20/00; G06T 7/521; G06T 7/55; G06T 2207/10028; G06T 2207/20081; G06T 2207/30252
See application file for complete search history.

(56) References Cited

U.S. PATENT DOCUMENTS 7,248,342 B1  7/2007 Degnan
11,082,681 B2 * 8/2021 Godard ................... G06T 7/593
(Continued)

FOREIGN PATENT DOCUMENTS

WO  WO-2021078385 A1 * 4/2021  ............. G06N 20/00

OTHER PUBLICATIONS

Santiago, R. et al, An Overview of Lidar Imaging System for Autonomous Vehicles, Applied Sciences, Sep. 30, 2019, Castellbisbal, Spain.
(Continued)

*Primary Examiner* — Ig T An (57) ABSTRACT

A method for training an artificial intelligence module for an advanced driver assistance system for obtaining a depth model of a scene uses data of a camera image and a depth image of a LIDAR sensor as input, and is trained for outputting the depth model of the scene. The depth model has a higher resolution than the depth image of the LIDAR sensor. The method of training the artificial intelligence module includes acquiring depth measurement data of the scene, which are obtained by combining images of a plurality of other LIDAR sensors, and which are used as a ground truth for the depth model of the scene.

11 Claims, 4 Drawing Sheets

(51) Int. Cl.

| | | |
|---|---|---|
| *B60W 30/095* | (2012.01) | |
| *G01S 17/04* | (2020.01) | |
| *G01S 17/89* | (2020.01) | |
| *G01S 17/931* | (2020.01) | |
| *G06N 20/00* | (2019.01) | |
| *G06T 7/521* | (2017.01) | |
| *G06T 7/55* | (2017.01) | |

(52) U.S. Cl.
CPC ............... *G06T 2207/10024* (2013.01); *G06T 2207/10028* (2013.01); *G06T 2207/20081* (2013.01); *G06T 2207/30252* (2013.01)

(56) References Cited

U.S. PATENT DOCUMENTS

| | | | |
|---|---|---|---|
| 2019/0004534 A1* | 1/2019 | Huang | G06F 18/251 |
| 2019/0295282 A1* | 9/2019 | Smolyanskiy | G06F 18/22 |
| 2020/0074266 A1* | 3/2020 | Peake | G06T 7/246 |
| 2020/0394813 A1* | 12/2020 | Theverapperuma | G06F 18/2431 |

OTHER PUBLICATIONS

Fangchang, M. et al, Self-Supervised Sparse-to-Dense: Self-Supervised Depth Completion from LIDAR, and Monocular Camera, Massachusetts Institute of Technology, Jul. 3, 2018.

Füleki, F. et al, Image-Based Depth Estimation with Deep Neural Networks, Budapest University of Technology and Ecomonics, Oct. 27, 2019.

Ledig, et. al, Photo-Realistic Single Image Super-Resolution Using Generative Adversarial Network, May 25, 2017.

Alshashim, et al, High Quality Monocular Depth Estimation via Transfer Learning, Dense Depth, Mar. 10, 2019.

European Search Report dated May 29, 2020 for corresponding European Patent Application No. 19209044.7.

Yang et al. "Object Contour Detection with a Fully Convolutional Encoder-Decoder Network", provided by the Computer Vision Foundation, https://openaccess.thecvf.com/content_cvpr_2016/papers/Yang_Object_Contour_Detection_CVPR_2016_paper.pdf, 2016.

* cited by examiner

SPATIAL AWARE OBJECT DETECTION BY LIDAR AND CAMERA FUSION BASED SUPER-RESOLUTION

CROSS REFERENCE TO RELATED APPLICATION

This application claims priority to European patent application No. EP 19209044.7, filed Nov. 14, 2019, which is hereby incorporated by reference.

TECHNICAL FIELD

The invention relates to a method for training an artificial intelligence module for an advanced driver assistance system for obtaining a depth model of a scene, an artificial intelligence module for an advanced driver assistance system for obtaining a depth model of a scene, an advanced driver assistance system comprising the artificial intelligence module, a use of the artificial intelligence module, a method for detecting objects in a scene, and a computer program element.

BACKGROUND

Object detection methods, for example for autonomous driving, have big challenges in situations of multiple objects close by in 3D space, leading to an inability to recognize differences between objects or classify objects incorrectly. A typical example may be a big traffic sign in the background of a car, which in combination may be interpreted as a truck by the object detection method.

Known object detection methods for autonomous driving follow camera only, LIDAR only, or simple, concatenation based fusion approaches. The performance of the results are capped by the information contained in the individual sensors. Camera based object detection lacks distance information; LIDAR based object detection performs poorly in case of a low-resolution LIDAR sensor; fusion based methods are yet very primitive and usually involve simple concatenation of features either early in the learning chain, called early-fusion or using a voting scheme for per-sensor predictions, called late fusion.

Artificial intelligence modules like neural networks may be utilized for obtaining a high-resolution depth model of the environment of a vehicle, starting from a low-resolution depth image of the environment. However, these depth completion methods using ground truth generation by camera-based semi-global matching or high-resolution scanning LIDAR sensors result in multiple artifacts including missing patches from motion of objects and dark or light areas on the edges of camera dynamic range.

As such, it is desirable to present a method for training an artificial intelligence module for an advanced driver assistance system that does not suffer from the above-mentioned drawbacks. It is also desirable to provide a method for training an artificial intelligence module for an advanced driver assistance system with an improved performance of obtaining a depth model of a scene. In addition, other desirable features and characteristics will become apparent from the subsequent summary and detailed description, and the appended claims, taken in conjunction with the accompanying drawings and this background.

BRIEF SUMMARY

The described embodiments pertain to a method for training an artificial intelligence module for an advanced driver assistance system for obtaining a depth model of a scene, the artificial intelligence module for an advanced driver assistance system for obtaining a depth model of a scene, the advanced driver assistance system comprising the artificial intelligence module, the use of the artificial intelligence module, the method for detecting objects in a scene, and the computer program element.

Synergetic effects may arise from different combinations of the embodiments although they might not be described in detail.

Further on, it shall be noted that all embodiments concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect, there is provided a method for training an artificial intelligence module for an advanced driver assistance system for obtaining a depth model of a scene. The method comprises acquiring multiple sets of training data, wherein each set of training data comprises a camera image of the scene taken by a camera of a vehicle in the visible optical range, a depth image of the scene taken by a flash LIDAR sensor of the vehicle, and depth measurement data of the scene, wherein the depth measurement data are obtained by combining images of a plurality of flash LIDAR sensors. The method comprises further the step of training the artificial intelligence module for the advanced driver assistance system with the multiple sets of training data, wherein the camera image and the depth image are used as input for the artificial intelligence module, wherein the artificial intelligence module is trained for outputting the depth model of the scene, and wherein the depth measurement data are used as ground truth for the depth model.

The method for training the artificial intelligence module uses sets of training data, which may be acquired of the environment of a vehicle, for example. One set of training data comprises a photo taken by a camera, preferably in the visible optical range, and with a relatively high resolution, which allows to obtain a detailed picture of the scene. The resolution of this camera image may be in the order of one million of pixels, for example 1280×800 or 1920×1080. Also higher or lower resolution is possible. The set of training data further comprises a depth image of the environment of the vehicle, which may be preferably taken at the same time, and which comprises a similar image section as depicted in the camera image. The depth image may be taken by a flash LIDAR sensor, which uses light for detection and ranging. The depth image comprises a resolution, which is typically lower than the resolution of the camera image, and which may be, for example, in the range of 128×32. The depth image comprises the distance of each pixel of the image from the flash LIDAR sensor. The camera and the flash LIDAR sensor may be mounted close by, such that the camera image and the depth image comprise a similar perspective of the environment of the vehicle. The set of training data further comprises depth measurement data of the scene, which comprise an image of the environment of the vehicle with distance information of each data point of the image from a position close to the camera and the flash LIDAR sensor and with a similar image section. The resolution of the depth measurement data may be higher than the resolution of the depth image, and may be in the range of the resolution of the camera image. The depth measurement data are obtained by combining measurements of a plurality of flash LIDAR sensors. Each flash LIDAR sensor of the plurality of flash LIDAR sensors may be mounted close to the flash LIDAR sensor that acquires the depth image. A flash LIDAR sensor emits a fanned out light pulse, preferably a laser pulse, which irradiates the whole image section at a time. The light of the light pulse is reflected at surfaces of objects in the image section, which are irradiated by the light pulse, and part of the light travels back to the flash LIDAR sensor, where the direction of the incident light and its time of travel is recorded. The depth measurement data combined of the measurements of the plurality of flash LIDAR sensors is used as ground truth in the method for training an artificial intelligence module for an advanced driver assistance system for obtaining a depth model of the scene. In other words, the artificial intelligence module is trained with multiple sets of training data as described above to output a depth model of the environment of the vehicle, if provided with a camera image of a scene and a depth image of the scene. The depth model of the scene outputted by the artificial intelligence module comprises preferably a resolution, which is in the order of the resolution of the camera image or of the depth measurement data. The artificial intelligence module is further trained to output the depth model with distance information of preferably similar to the depth measurement data used as ground truth. In this manner, the artificial intelligence module can be configured, when already trained, to output a depth model of a scene with a second resolution, when provided with a camera image of the scene and a depth image with a first resolution of the scene, wherein the second resolution is higher than the first resolution.

In one embodiment, the plurality of flash LIDAR sensors of which images are combined are not of the vehicle.

The plurality of flash LIDAR sensors is in this embodiment not a part of the vehicle. For example, a recording car comprising a camera, a flash LIDAR sensor, and the plurality of flash LIDAR sensors can be used to acquire the multiple sets of training data, which are used for training of the artificial intelligence module. After the method of training is successfully performed, a trained artificial intelligence module can be implemented in a production car, which comprises a camera and a flash LIDAR sensor, but not the plurality of flash LIDAR sensors used for combining their images to the depth measurement data used as ground truth in the training of the artificial intelligence module.

In an embodiment, the images of the plurality of flash LIDAR sensors are combined in order to obtain the depth measurement data of the scene from a perspective of the flash LIDAR sensor of the vehicle, and the obtained depth measurement data of the scene comprise a higher resolution than each of the images of the plurality of flash LIDAR sensors.

By combining the images of a plurality of flash LIDAR sensors for obtaining the depth measurement data used as ground truth, many drawbacks compared to the use of, for example, scanning LIDARS with an intrinsically higher resolution can be overcome. According to this embodiment, there is no rolling shutter effect as a flash LIDAR sensor has a global shutter, which would lead to strong artifacts on dynamic objects, and the resulting depth model would be very sensitive to top speed, especially the speed of other traffic participants.

Using multiple flash LIDAR sensors also results in lower scene self-occlusion and fewer shadows between objects from the perspective change from the acquired ground truth training data and the input data of the camera and the depth image of the flash LIDAR sensor, as the plurality of flash LIDAR sensors can be mounted physically closer to the camera and the flash LIDAR sensor than a scanning LIDAR, which has typically to be mounted on top of the recording car.

Further, the number of frames per second, which are acquired by a flash LIDAR sensor is typically higher than the number of frames per second acquired by a scanning LIDAR. Thus, the sensitivity to motion of objects can be reduced, thereby preventing motion artifacts.

The time synchronized multi-flash LIDAR setup allows not to use Semi-Global Matching and heavy time densification, as it is possible to use multiple simultaneously triggered global shutter flash LIDAR units. This itself may add a lot of robustness to the ground truth training data.

For preventing interference of flash LIDAR sensors of the plurality of flash LIDAR sensors with each other when working simultaneously, a well calibrated time synchronization between the individual flash LIDAR units can be performed. Each sensor can be delayed with respect to the others by just that many milliseconds, which is the maximum round-trip time of the previous sensor's light pulse. This way it is possible to use multiple flash LIDARs almost simultaneously on a recording car without illumination interference.

As multiple flash LIDAR sensors cannot occupy the same location, they will have some distance between them, which results in slightly different viewing angles of the same scene. This may result in complicated occlusions when projecting all of the sensors onto the same camera image. This can be solved by creating a mesh grid of each LIDAR scene and performing occlusion filtering to combine them.

The resulting recording setup itself can be a key contributor in the whole learning chain and thus makes the whole training of the artificial intelligence module more accurate, leading to an increase in performance. In this embodiment, it is thus possible to use a much lower resolution flash LIDAR in a production car.

In an embodiment, the method further comprises preprocessing the multiple sets of training data, particularly with occlusion filtering.

The images of the different sensors may be preprocessed with preprocessing methods like occlusion filtering. Thus, the influence of different perspectives of sensors with a deviating position can be reduced. In addition or as an alternative, the inputs from the plurality of sensors can be transformed to the perspective of a master sensor.

In an embodiment, training the artificial intelligence module comprises calculating a first loss function regarding a supervised super-resolution loss representing a deviation of the depth model of the artificial intelligence module from the ground truth in a first field of view.

The artificial intelligence module may be trained with respect to the minimization of a first loss function, which can be calculated with respect to the difference between the depth measurement data used as ground truth and the depth model outputted from the artificial intelligence module. The first field of view is part of the camera image and the depth image of the flash LIDAR sensor. The first field of view is also covered by the ground truth. Thus, the output of the depth model can be trained with the minimization of the loss function regarding supervised loss.

In an embodiment, the step of training the artificial intelligence module further comprises calculating a second loss function regarding an unsupervised scene structure loss based on a structural content of the camera image of the scene in a second field of view.

The artificial intelligence module may be trained with respect to the minimization of a second loss function, which can be derived from the scene structure depicted in the camera image, resulting in an unsupervised scene structure loss. The second field of view is part of the camera image of the scene, but needs not to be part of the field of view of the flash LIDAR sensor or the plurality of flash LIDAR sensors used for generating the ground truth. During training of the artificial intelligence module, there may be no ground truth available for calculating the depth model in this second field of view, and the depth model can be obtained via unsupervised scene structure loss, derived from the camera image.

In an embodiment of the invention, the first field of view is comprised within the field of view of the camera and the field of view of the flash LIDAR sensor, and the second field of view is comprised within the field of view of the camera, and the depth model in the second field of view is calibrated with the depth model in the first field of view.

The camera might have a higher horizontal and/or vertical field of view than the flash LIDAR sensor. In this embodiment of the invention, it is possible to derive a depth model in the part of the camera image, which is not overlapping with the depth image of the flash LIDAR sensor. A calibration can be performed as the depth model in the second field of view is calibrated to the depth model in adjacent regions of the first field of view.

In an embodiment of the invention, the depth model comprises a distance of each data point of the depth model from the camera and/or from the flash LIDAR sensor.

The depth model comprises the result of a depth completion and therefore the information regarding the distance of each data point in the depth model from the position of the camera and/or the flash LIDAR sensor. Thus, the depth model allows a three-dimensional reconstruction of the environment of the vehicle.

In an embodiment of the invention, the depth model further comprises a reflectivity of each data point of the depth model with respect to a radiation of the flash LIDAR sensor, and/or the depth model further comprises for of each data point of the depth model the RGB values of the camera image.

Each data point of the depth model can be further provided with the reflectivity of the respective position in the environment of the vehicle with respect to the light emitted from the flash LIDAR sensor and with respect to the light detected by the camera. Thus, the depth model also may comprise a color of each data point in RGB values as well as an amplitude of the light pulse of the LIDAR sensor that is reflected back to the sensor.

In an embodiment of the invention, the depth model of the scene comprises a higher resolution than the depth image of the scene of the flash LIDAR sensor.

The depth model may comprise a higher resolution than the depth image used as input of the artificial intelligence module, thereby performing a depth completion of the scene. The depth completion method uses a depth image with a first resolution, and estimates based on the camera image and the training data a depth model with a second resolution, wherein the second resolution is higher than the first resolution and preferably in the order of the resolution of the camera image.

According to another aspect of the invention, there is provided an artificial intelligence module for an advanced driver assistance system for obtaining a depth model of a scene, wherein the artificial intelligence module is trained with a method according to any of the previous embodiments.

According to an exemplary embodiment of the invention, there is provided an artificial intelligence module for an advanced driver assistance system for obtaining a depth model of a scene. The artificial intelligence module is configured for being trained with multiple sets of training data, wherein each set of training data comprises a camera image of the scene taken by a camera of a vehicle in the visible optical range, a depth image of the scene taken by a flash LIDAR sensor of the vehicle, and depth measurement data of the scene, wherein the depth measurement data are obtained by combining images of a plurality of flash LIDAR sensors. The artificial intelligence module is configured for using the camera image and the depth image of the scene of each set of training data as input, and the artificial intelligence module is configured for outputting the depth model of the scene, and the artificial intelligence module is configured for using the depth measurement data of the scene as ground truth for the depth model of the scene.

The artificial intelligence module is configured to be trained with sets of training data comprising a camera image, a depth image of a flash LIDAR sensor and depth measurement data obtained by combining the images of a plurality of flash LIDAR sensors. The depth measurement data is used as ground truth for training the artificial intelligence module to output a depth model with a higher resolution of a scene than the resolution of a depth image of the scene, when the artificial intelligence module is provided with the depth image and the camera image of the scene.

According to another aspect of the invention, there is provided an advanced driver assistance system comprising the artificial intelligence module according to any of the previous embodiments of the invention.

The artificial intelligence module as described above can be implemented in an advanced driver assistance system of a vehicle. The advanced driver assistance system may use the artificial intelligence module to perform a depth completion and contribute to an object detection in the environment of the vehicle.

In an embodiment of the invention, the advanced driver assistance system further comprises a camera configured for taking an image of the scene in the visible optical range, and a flash LIDAR sensor configured for taking a depth image of the scene.

The advanced driver assistance system of the vehicle can comprise a camera and a flash LIDAR sensor. The camera and the flash LIDAR sensor may be part of the vehicle and may be mounted at the front side or at other sides of the car, for example next to or behind the wind shield of the vehicle.

According to another aspect of the invention, there is provided a method for obtaining a depth model of a scene in a vehicle using an artificial intelligence module according to any of the previous embodiments of the invention or an artificial intelligence module trained according to any of the previous embodiments of the invention. The method comprises acquiring a camera image of the scene taken by a camera of the vehicle in the visible optical range and providing the camera image to the artificial intelligence module, and acquiring a depth image of the scene taken by a flash LIDAR sensor of the vehicle and providing the depth image to the artificial intelligence module. The method comprises further obtaining from the artificial intelligence module the depth model of the scene by providing the trained artificial intelligence module with the camera image and the depth image.

The artificial intelligence module can be used in a method for obtaining a depth model of a scene when the artificial intelligence module is properly trained with sets of training data and provided with a camera image and a depth image of a flash LIDAR sensor. The sets of training data comprise further to a camera image and a depth image of the scene depth measurement data of the scene, which is used as ground truth in the training process.

In an embodiment of the invention, the method further comprises detecting an object in the scene by using at least the depth model of the scene.

The method for detecting an object in a scene comprises training an artificial intelligence module with sets of training data comprising a camera image, a depth image taken by a flash LIDAR sensor and depth measurement data obtained by combining the images of a plurality of flash LIDAR sensors. The method further comprises obtaining a depth model as output from the trained artificial intelligence module, and detecting objects by using at least the depth model of the scene. In addition to the depth model, also reflectance values acquired by the LIDAR sensor and RGB values of the camera can be utilized for detecting and/or classifying objects in the scene.

According to another aspect of the invention, there is provided a computer program element which when executed on a processor performs the method according to any of the previous embodiments of the invention.

The computer program element can be executed on one or more CPUs or GPUs and performs when executed the training of an artificial intelligence module as described in the previous embodiments. In addition or as an alternative, the computer program element performs when executed the obtaining of a depth model and/or the detection of objects in a scene.

The benefits provided by any of the above aspects equally apply to all of the other aspects and vice versa.

In a gist, the invention relates to a method for training an artificial intelligence module for an advanced driver assistance system for obtaining a depth model of a scene. The artificial intelligence module uses data of a camera image and a depth image of a flash LIDAR sensor as input, and is trained for outputting the depth model of the scene, wherein the depth model has a higher resolution than the depth image of the flash LIDAR sensor. The method of training the artificial intelligence module comprises acquiring depth measurement data of the scene, which are obtained by combining images of a plurality of flash LIDAR sensors, and which are used as a ground truth for the depth model of the scene.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
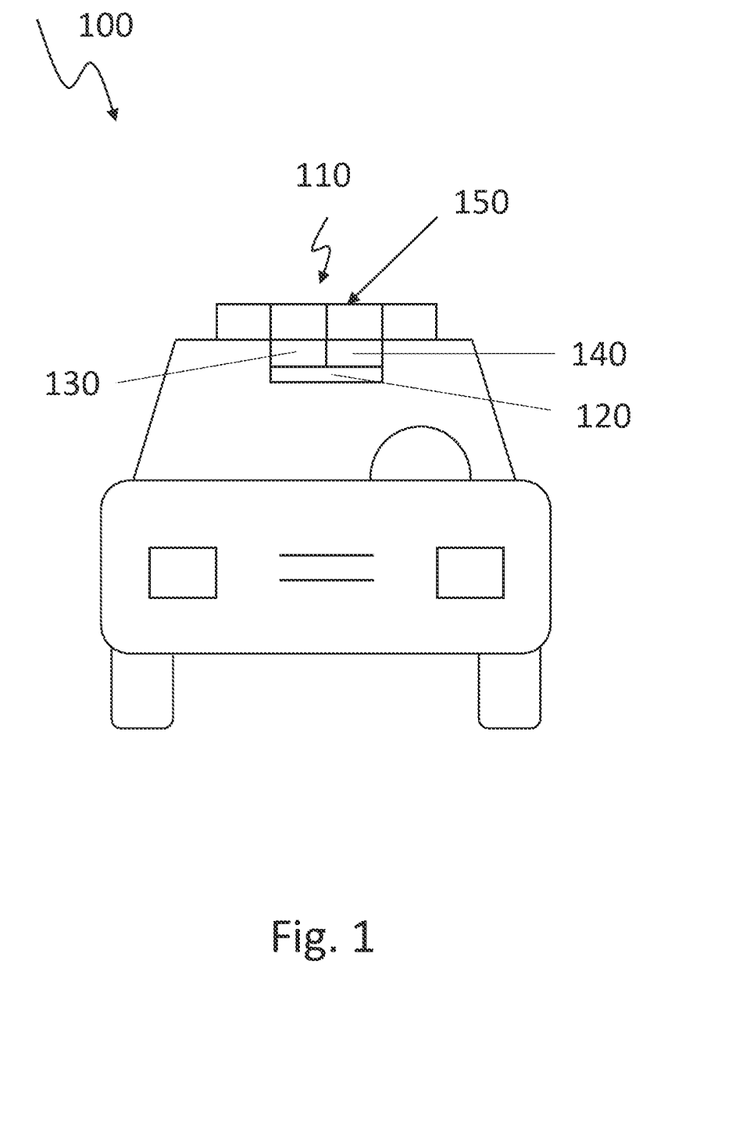
FIG. 1 shows a schematic set-up of a recording vehicle.

FIG. 1 shows a schematic set-up of a recording vehicle 100. The vehicle 100 comprises an advanced driver assistance unit 110 comprising a camera 130, a flash LIDAR sensor 140 and an artificial intelligence module 120. Further, the recording vehicle comprises a plurality of flash LIDAR sensors 150. With this recording vehicle 100, the training of the artificial intelligence module can be performed. Multiple sets of training data can be acquired each comprising a camera image taken by the camera 130, a depth image taken by the flash LIDAR sensor 140, and depth measurement data obtained by combining images of the plurality of flash LIDAR sensors 150. With these data sets, training of the artificial intelligence module 120 can be performed. The artificial intelligence module 120 is trained to provide a depth model of a scene depicted by the images of the camera 130 and the sensor when provided with a camera image and a depth image of the scene. For training, the depth measurement data are used as ground truth, such that the artificial intelligence module 120 can compare the depth model to be outputted with the ground truth and can calculate a loss function to be minimized.

Figure 2:
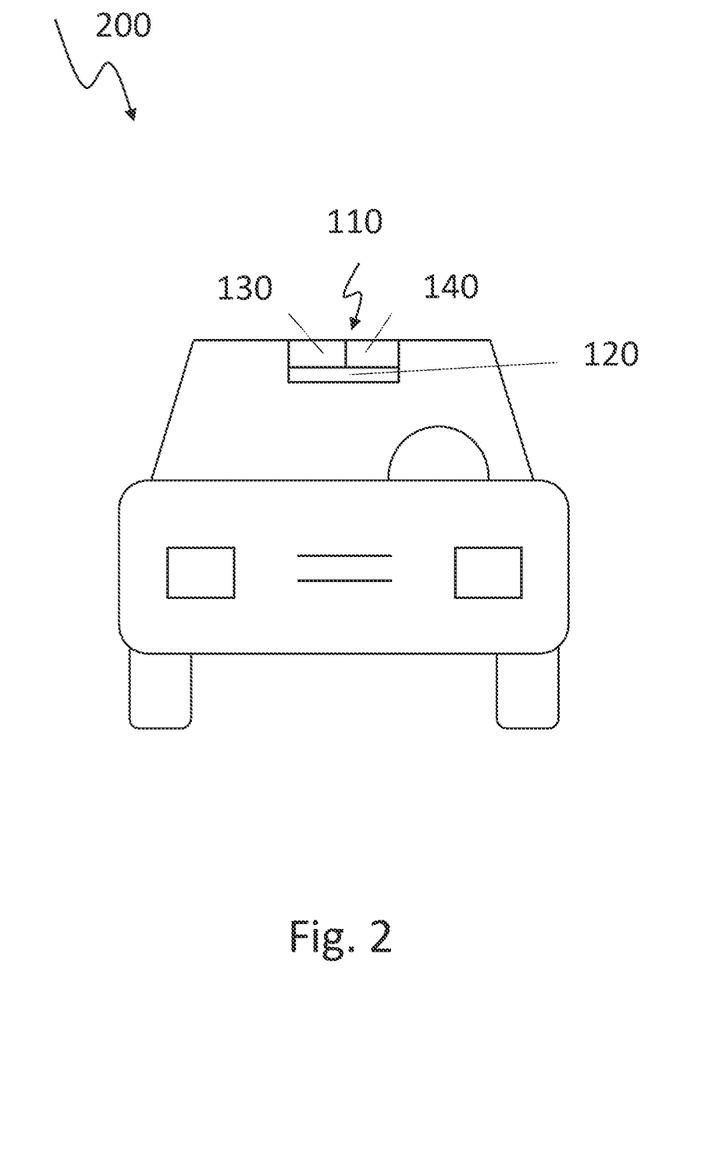
FIG. 2 shows a schematic set-up of a production vehicle.

FIG. 2 shows a schematic set-up of a production vehicle 200. The production vehicle 200 comprises an advanced driver assistance system 110 comprising a camera 130, a flash LIDAR sensor 140 and an artificial intelligence module 120 trained according to one embodiment. After successful training, the artificial intelligence module 120 can obtain a depth model of a scene, for example in front of the production vehicle 200, when provided with an image of the camera 130 and a depth image of the flash LIDAR sensor 140. The resolution of the depth model can be higher than the resolution of the depth image.

Figure 3:
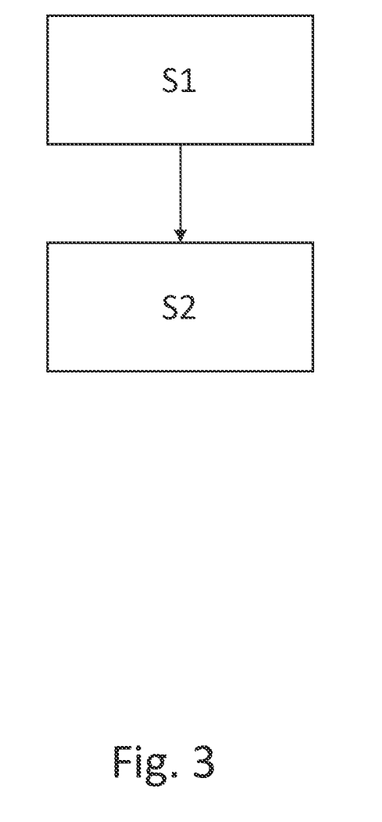
FIG. 3 shows a block diagram of a method for training an artificial intelligence module according to the invention.

FIG. 3 shows a block diagram of a method for training an artificial intelligence module 120 for an advanced driver assistance system 110 according to one embodiment. At S1, multiple sets of training data are acquired. Each set of training data includes a camera image of the scene taken by a camera 130 of a vehicle 100 in the visible optical range, a depth image of the scene taken by a flash LIDAR sensor 140 of the vehicle 100, and depth measurement data of the scene, wherein the depth measurement data are obtained by combining images of a plurality of flash LIDAR sensors 150. At S2, the artificial intelligence module 120 for the advanced driver assistance system 110 is trained with the multiple sets of training data. The camera image and the depth image are used as input for the artificial intelligence module 120, the artificial intelligence module 120 is trained for outputting the depth model of the scene, and the depth measurement data are used as ground truth for the depth model.

Figure 4:
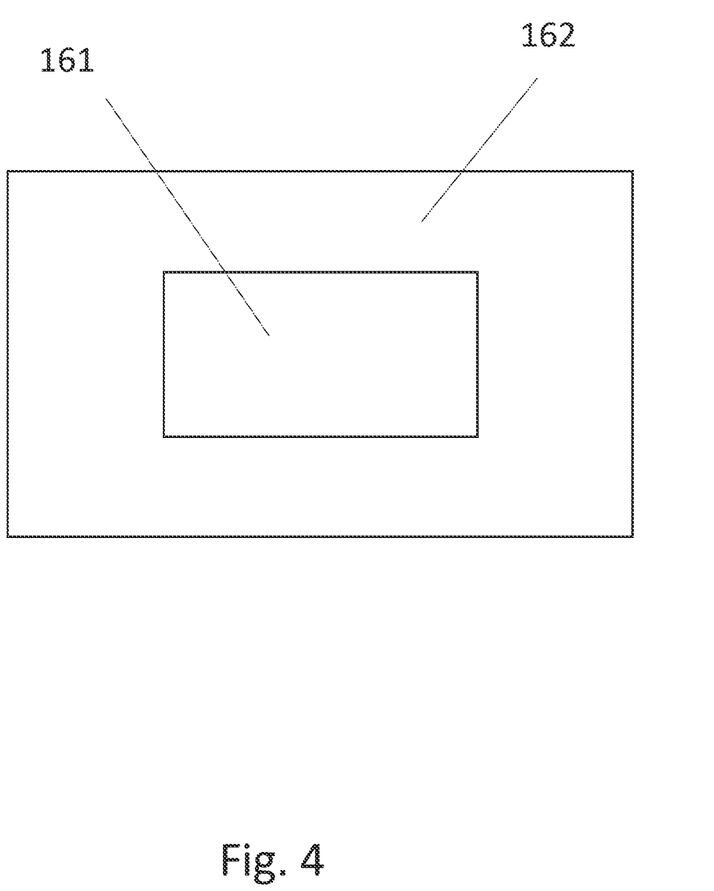
FIG. 4 shows the first field of view and the second field of view.

FIG. 4 shows the first field of view 161 and the second field of view 162. The first field of view 161 is defined by the field of view of the flash LIDAR sensor 140 and the field of view of the camera 130. Preferably, both are overlapping in the region of the first field of view. The second field of view 162 is the part of the field of view of the camera, which is not covered by the field of view of the flash LIDAR sensor. In the first field of view 161, the artificial intelligence module 120 can be trained with supervised loss, wherein the artificial intelligence module 120 in the second field of view 162 is trained with unsupervised loss. The depth of the depth model in the second field of view 162 may be calibrated with the depth of the depth model in the first field of view 161, as the first field of view 161 and the second field of view 162 are adjacent to each other, and the depth is preferably continuous in the scene.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

What is claimed is:

1. A method for training an artificial intelligence module of an advanced driver assistance system for obtaining a depth model of a scene, the method comprising:
    acquiring multiple sets of training data, each set of training data among the multiple sets of training data including a camera image of the scene taken by a camera of a vehicle, a depth image of the scene at a first resolution taken by a LIDAR sensor of the vehicle, the depth image comprising data indicating a distance of each pixel of the depth image from the LIDAR sensor, and depth measurement data of the scene at a second resolution that is higher than the first resolution taken by a plurality of other LIDAR sensors, the depth measurement data comprising data indicating a distance of each pixel of images of the plurality of other LIDAR sensors from the plurality of other LIDAR sensors;
    combining the images of the plurality of other LIDAR sensors to obtain the depth measurement data of the scene from a perspective of the LIDAR sensor of the vehicle, wherein a resolution of the depth measurement data of the scene is higher than a resolution of the images of the plurality of other LIDAR sensors; and
    training the artificial intelligence module of the advanced driver assistance system with the multiple sets of training data for obtaining the depth model of the scene with the second resolution if provided with the camera image and the depth image with the first resolution as inputs to the artificial intelligence model.

2. The method according to claim 1, wherein the plurality of other LIDAR sensors of which images are combined are not of the vehicle.

3. The method according to claim 1, further comprising preprocessing the multiple sets of training data with occlusion filtering.

4. The method according to claim 1, wherein the depth measurement data are used as ground truth for the depth model, and wherein training the artificial intelligence module comprises calculating a first loss function regarding a supervised super-resolution loss representing a deviation of the depth model of the artificial intelligence module from the ground truth in a first field of view.

5. The method according to claim 4, wherein training the artificial intelligence module further comprises calculating a second loss function regarding an unsupervised scene structure loss based on a structural content of the camera image of the scene in a second field of view.

6. The method according to claim 5, wherein the first field of view is comprised within the field of view of the camera and the field of view of the LIDAR sensor, wherein the second field of view is comprised within the field of view of the camera, and wherein the depth model in the second field of view is calibrated with the depth model in the first field of view.

7. The method according to claim 1, wherein the depth model comprises a distance of each data point of the depth model from the camera and/or from the LIDAR sensor.

8. The method according to claim 1, wherein the depth model further comprises a reflectivity of each data point of the depth model with respect to a radiation of the LIDAR sensor.

9. The method according to claim 1, wherein the depth model further comprises the RGB values of the camera image for each data point.

10. The method according to claim 1, wherein the depth model of the scene comprises a resolution higher than the first resolution of the depth image of the scene of the LIDAR sensor.

11. An advanced driver assistance system, comprising:
    a camera configured to capture an image of the scene;
    a LIDAR sensor configured to capture a depth image of the scene at a first resolution; and
    a processor configured to train an artificial intelligence module for obtaining a depth model of the scene by acquiring multiple sets of training data, each set of training data among the multiple sets of training data including a camera image of the scene taken by the camera, a depth image of the scene taken by the LIDAR sensor, the depth image comprising data indicating a distance of each pixel of the depth image from the LIDAR sensor, and depth measurement data of the scene at a second resolution that is higher than the first resolution taken by a plurality of other LIDAR sensors, the depth measurement data comprising data indicating a distance of each pixel of images of the plurality of other LIDAR sensors from the plurality of other LIDAR sensors;
    combine the images of the plurality of other LIDAR sensors to obtain the depth measurement data of the scene from a perspective of the LIDAR sensor of the vehicle, wherein a resolution of the depth measurement data of the scene is higher than a resolution of the images of the plurality of other LIDAR sensors; and
    wherein the artificial intelligence module is configured to output the depth model of the scene with the second resolution if provided with the camera image and the depth image with the first resolution as inputs to the artificial intelligence model.

* * * * *